(12) United States Patent
Chen et al.

(10) Patent No.: US 10,657,202 B2
(45) Date of Patent: May 19, 2020

(54) COGNITIVE PRESENTATION SYSTEM AND METHOD

(71) Applicant: International Business Machines Corporation, Armonk, NY (US)

(72) Inventors: Nan Chen, Beijing (CN); June-Ray Lin, Taipei (TW); Ju Ling Liu, Beijing (CN); Jin Zhang, Beijing (CN); Li Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 15/837,589

(22) Filed: Dec. 11, 2017

(65) Prior Publication Data

US 2019/0179892 A1    Jun. 13, 2019

(51) Int. Cl.
| | |
|---|---|
| *G06F 17/27* | (2006.01) |
| *G10L 15/26* | (2006.01) |
| *G06F 17/22* | (2006.01) |
| *G06F 16/483* | (2019.01) |

(52) U.S. Cl.
CPC ........ *G06F 17/2765* (2013.01); *G06F 16/483* (2019.01); *G06F 17/2229* (2013.01); *G06F 17/277* (2013.01); *G10L 15/26* (2013.01); *G10L 15/265* (2013.01)

(58) Field of Classification Search
CPC ............................ G06F 17/2765; G10L 15/265
See application file for complete search history.

(56) References Cited

U.S. PATENT DOCUMENTS

| | | | | |
|---|---|---|---|---|
| 6,076,059 A * | 6/2000 | Glickman | ............... | G10L 15/26 704/252 |
| 6,185,527 B1 | 2/2001 | Petkovic et al. | | |
| 6,263,308 B1 * | 7/2001 | Heckerman | ........... | G10L 15/063 704/231 |
| 6,553,342 B1 | 4/2003 | Zhang et al. | | |
| 6,714,909 B1 * | 3/2004 | Gibbon | ............... | G06F 16/7834 704/246 |
| 7,729,478 B1 * | 6/2010 | Coughlan | ......... | H04M 3/53333 379/88.04 |
| 8,171,412 B2 * | 5/2012 | Sand | .................... | G10L 15/1822 704/251 |
| 8,768,706 B2 | 7/2014 | Schubert et al. | | |

(Continued)

OTHER PUBLICATIONS

IP.Com, "Method and System for Optimized Playback of Presentations Offline," IP.Com Disclosure Number: IPCOM000249454D, Published Feb. 27, 2017, pp. 1.

(Continued)

*Primary Examiner* — Fariba Sirjani
(74) *Attorney, Agent, or Firm* — Reza Sarbakhsh

(57) ABSTRACT

A method, computer program product, and computing system for receiving a presentation file including one or more audio portions and one or more textual portions. An audio transcript of the one or more audio portions of the presentation file may be generated. A textual transcript of the one or more textual portions of the presentation file may be generated. One or more rich portions of the presentation file may be determined based upon, at least in part, a comparison of the audio transcript and the textual transcript. At least the one or more rich portions of the presentation file may be presented.

8 Claims, 13 Drawing Sheets

(56) References Cited

U.S. PATENT DOCUMENTS

| | | | | |
|---|---|---|---|---|
| 9,043,691 B2* | 5/2015 | Monro | | G11B 27/034 |
| | | | | 715/201 |
| 9,189,482 B2 | 11/2015 | Danielyan et al. | | |
| 9,633,008 B1 | 4/2017 | Brand et al. | | |
| 2002/0133520 A1* | 9/2002 | Tanner | | G06F 16/40 |
| | | | | 715/202 |
| 2004/0263636 A1* | 12/2004 | Cutler | | H04N 7/15 |
| | | | | 348/211.12 |
| 2005/0021343 A1 | 1/2005 | Spencer | | |
| 2007/0033528 A1* | 2/2007 | Merril | | G02B 26/0816 |
| | | | | 715/732 |
| 2009/0006087 A1* | 1/2009 | Imoto | | G10L 13/00 |
| | | | | 704/231 |
| 2009/0125299 A1* | 5/2009 | Wang | | G10L 15/22 |
| | | | | 704/201 |
| 2009/0319265 A1* | 12/2009 | Wittenstein | | G10L 21/04 |
| | | | | 704/234 |
| 2011/0320197 A1* | 12/2011 | Conejero | | G10L 15/26 |
| | | | | 704/235 |
| 2012/0245719 A1* | 9/2012 | Story, Jr. | | G06F 3/0488 |
| | | | | 700/94 |
| 2013/0205213 A1* | 8/2013 | Mitros | | G06F 3/048 |
| | | | | 715/719 |
| 2013/0298016 A1* | 11/2013 | Chigier | | G06F 17/24 |
| | | | | 715/256 |
| 2014/0223272 A1* | 8/2014 | Arora | | G09B 5/06 |
| | | | | 715/203 |
| 2015/0081611 A1 | 3/2015 | Shivakumar | | |
| 2017/0133058 A1 | 5/2017 | Panchapakesan et al. | | |

OTHER PUBLICATIONS

Kojiri et al., "Effective Presentation Speech Support System for Representing Emphasis-Intention," Systems, 2016, 4, 1: doi:10.3390/Systems4010001, www.mdpi.com/journal/systems, Sep. 29, 2015; pp. 1-9.

IBM, Watson™, "Natural Language Understanding", Demo, printed Oct. 24, 2019, 1 page, https://natural-language-understanding-demo.ng.bluemix.net/.

IBM, Watson™, "Speech to Text", Demo, printed Oct. 24, 2019, 1 page, https://speech-to-text-demo.ng.bluemix.net/?cm_mc_uid=07757229611.

* cited by examiner

COGNITIVE PRESENTATION SYSTEM AND METHOD

BACKGROUND

Live presentations and/or conference calls are often used to present ideas or discuss concepts. During these presentations and/or conference calls, audio and/or video of the presentation may be recorded for playback if an audience is unable to attend the presentation. Offline audiences may need to spend time to replay the presentation and audio to understand the presentation comprehensively. Offline audiences may need to go through the entire audio recording to hear the audio of each page of the presentation to ensure that no important or interesting content is missed.

BRIEF SUMMARY OF DISCLOSURE

In one example implementation, a computer-implemented method is executed on a computing device and may include but is not limited to receiving, at a computing device, a presentation file including one or more audio portions and one or more textual portions. An audio transcript of the one or more audio portions of the presentation file may be generated. A textual transcript of the one or more textual portions of the presentation file may be generated. One or more rich portions of the presentation file may be determined based upon, at least in part, a comparison of the audio transcript and the textual transcript. At least the one or more rich portions of the presentation file may be presented.

One or more of the following example features may be included. Generating the audio transcript of the one or more audio portions may include associating the one or more textual portions of the presentation file with the one or more audio portions of the presentation file. Generating the audio transcript of the one or more audio portions may include extracting one or more words from the one or more audio portions based upon, at least in part, the textual portion of the presentation file associated with the one or more audio portions. Determining the one or more rich portions may include comparing the one or more words from the audio transcript and the one or more words from the textual transcript based upon, at least in part, the one or more textual portions of the presentation file associated with the one or more audio portions of the presentation file and determining the one or more audio portions of the presentation file that include one or more words that are not included in the associated one or more textual portions, thus defining the one or more rich portions of the presentation file. Presenting the one or more rich portions of the presentation file may include presenting one or more non-rich portions of the presentation file at a first speed and presenting the one or more rich portions of the presentation file at a second speed. Determining the one or more rich portions may include recognizing at least one of one or more concepts and one or more speakers in the one or more audio portions of the presentation file.

In another example implementation, a computer program product resides on a non-transitory computer readable medium that has a plurality of instructions stored on it. When executed across one or more processors, the plurality of instructions cause at least a portion of the one or more processors to perform operations that may include but are not limited to receiving a presentation file including one or more audio portions and one or more textual portions. An audio transcript of the one or more audio portions of the presentation file may be generated. A textual transcript of the one or more textual portions of the presentation file may be generated. One or more rich portions of the presentation file may be determined based upon, at least in part, a comparison of the audio transcript and the textual transcript. At least the one or more rich portions of the presentation file may be presented.

One or more of the following example features may be included. Generating the audio transcript of the one or more audio portions may include associating the one or more textual portions of the presentation file with the one or more audio portions of the presentation file. Generating the audio transcript of the one or more audio portions may include extracting one or more words from the one or more audio portions based upon, at least in part, the textual portion of the presentation file associated with the one or more audio portions. Determining the one or more rich portions may include comparing the one or more words from the audio transcript and the one or more words from the textual transcript based upon, at least in part, the one or more textual portions of the presentation file associated with the one or more audio portions of the presentation file and determining the one or more audio portions of the presentation file that include one or more words that are not included in the associated one or more textual portions, thus defining the one or more rich portions of the presentation file. Presenting the one or more rich portions of the presentation file may include presenting one or more non-rich portions of the presentation file at a first speed and presenting the one or more rich portions of the presentation file at a second speed. Determining the one or more rich portions may include recognizing at least one of one or more concepts and one or more speakers in the one or more audio portions of the presentation file.

In another example implementation, a computing system may include one or more processors and one or more memories, wherein the computing system is configured to perform operations that may include but are not limited to receiving a presentation file including one or more audio portions and one or more textual portions. An audio transcript of the one or more audio portions of the presentation file may be generated. A textual transcript of the one or more textual portions of the presentation file may be generated. One or more rich portions of the presentation file may be determined based upon, at least in part, a comparison of the audio transcript and the textual transcript. At least the one or more rich portions of the presentation file may be presented.

One or more of the following example features may be included. Generating the audio transcript of the one or more audio portions may include associating the one or more textual portions of the presentation file with the one or more audio portions of the presentation file. Generating the audio transcript of the one or more audio portions may include extracting one or more words from the one or more audio portions based upon, at least in part, the textual portion of the presentation file associated with the one or more audio portions. Determining the one or more rich portions may include comparing the one or more words from the audio transcript and the one or more words from the textual transcript based upon, at least in part, the one or more textual portions of the presentation file associated with the one or more audio portions of the presentation file and determining the one or more audio portions of the presentation file that include one or more words that are not included in the associated one or more textual portions, thus defining the one or more rich portions of the presentation file. Presenting the one or more rich portions of the presentation file may include presenting one or more non-rich portions of the presentation file at a first speed and presenting the one or more rich portions of the presentation file at a second speed. Determining the one or more rich portions may include recognizing at least one of one or more concepts and one or more speakers in the one or more audio portions of the presentation file.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE SEVERAL VIEWS OF THE DRAWINGS

Like reference symbols in the various drawings indicate like elements.

DETAILED DESCRIPTION

Figure 1:
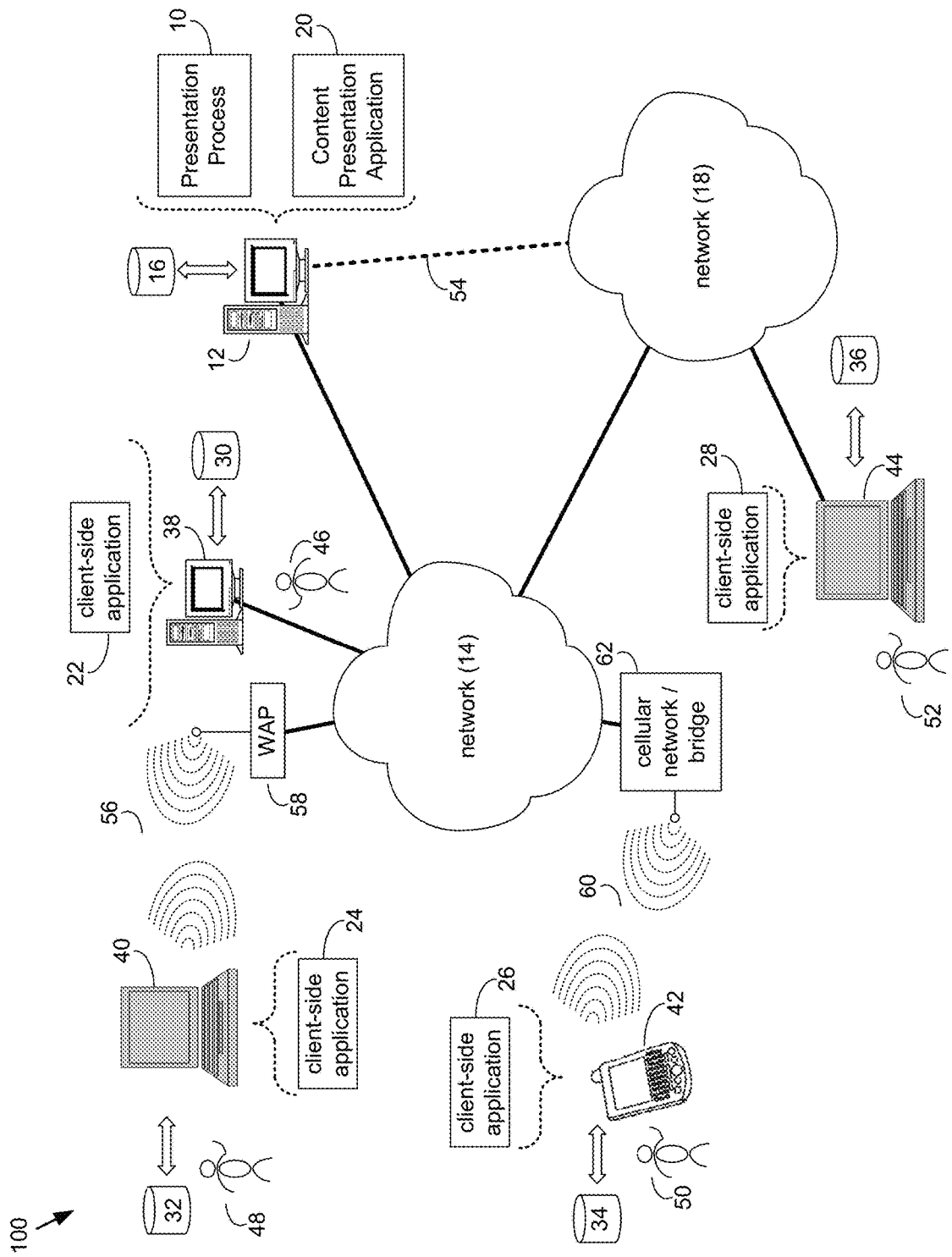
FIG. 1 is an example diagrammatic view of presentation process coupled to a distributed computing network according to one or more example implementations of the disclosure.
Figure 2:
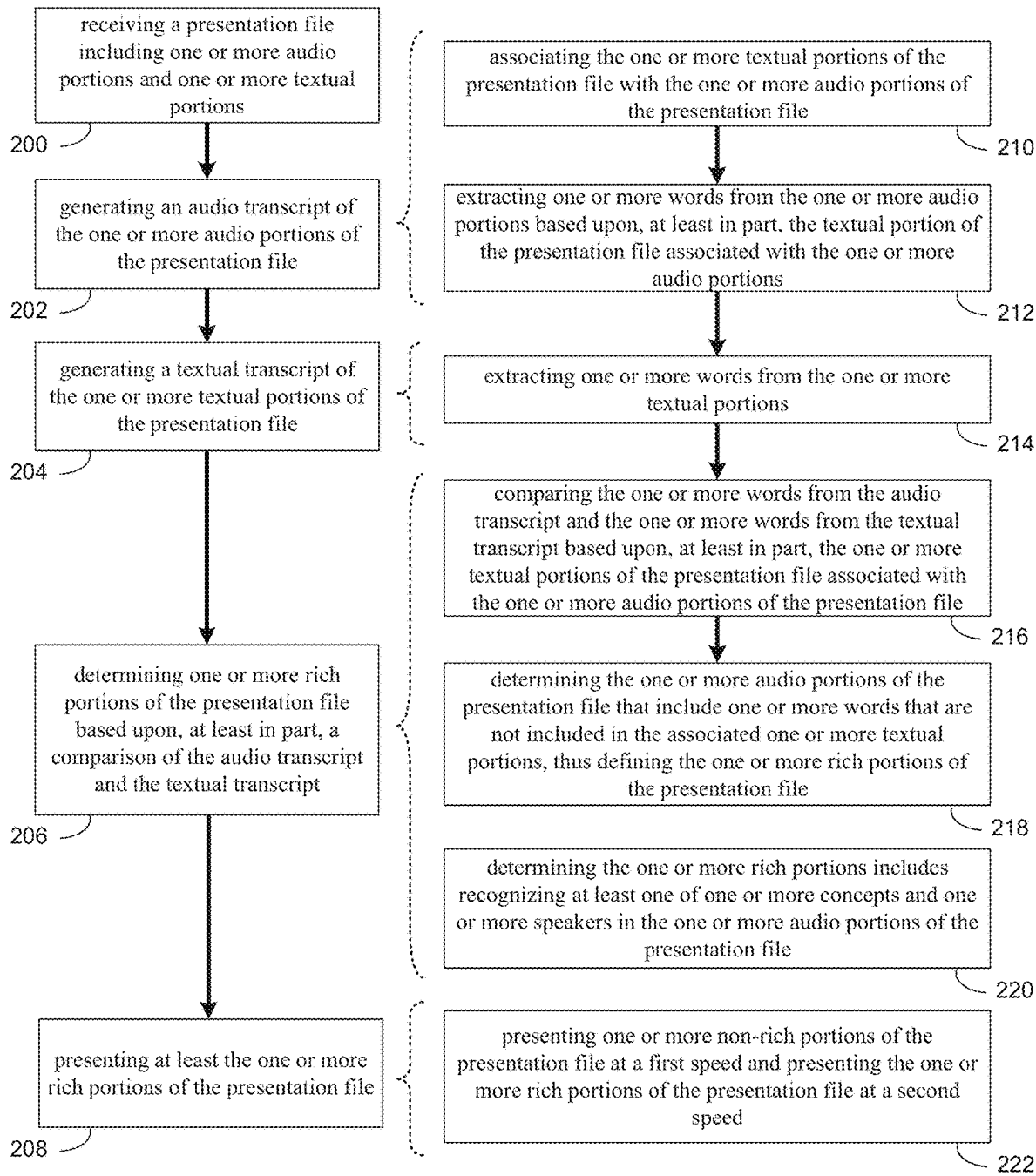
FIG. 2 is an example flowchart of the presentation process of FIG. 1 according to one or more example implementations of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown presentation process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a presentation process, such as presentation process 10 of FIG. 1, may receive a presentation file including one or more audio portions and one or more textual portions. An audio transcript of the one or more audio portions of the presentation file may be generated. A textual transcript of the one or more textual portions of the presentation file may be generated. One or more rich portions of the presentation file may be determined based upon, at least in part, a comparison of the audio transcript and the textual transcript. At least the one or more rich portions of the presentation file may be presented.

The instruction sets and subroutines of presentation process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Presentation process 10 may be a stand-alone application that interfaces with an applet/application that is accessed via client applications 22, 24, 26, 28. In some embodiments, presentation process 10 may be, in whole or in part, distributed in a cloud computing topology. In this way, computing device 12 and storage device 16 may refer to multiple devices, which may also be distributed throughout network 14 and/or network 18.

Computing device 12 may execute a content presentation application (e.g., content presentation application 20), examples of which may include, but are not limited to, applications that provide content (e.g., text, articles, presentations, etc.) to a user. For example, content presentation applications may include web applications, educational applications, word processing applications, slide-sharing applications, conference call applications, other presentation application and tools, etc. Presentation process 10 and/or content presentation application 20 may be accessed via client applications 22, 24, 26, 28. Presentation process 10 may be a stand-alone application, or may be an applet/ application/script/extension that may interact with and/or be executed within content presentation application 20, a component of content presentation application 20, and/or one or more of client applications 22, 24, 26, 28. Content presentation application 20 may be a stand-alone application, or may be an applet/application/script/extension that may interact with and/or be executed within presentation process 10, a component of presentation process 10, and/or one or more of client applications 22, 24, 26, 28. One or more of client applications 22, 24, 26, 28 may be a stand-alone application, or may be an applet/application/script/extension that may interact with and/or be executed within and/or be a component of presentation process 10 and/or content presentation application 20. Examples of client applications 22, 24, 26, 28, 66 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, 802 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 66 may be configured to effectuate some or all of the functionality of presentation process 10 (and vice versa). Accordingly, presentation process 10 may be a purely server-side application, a purely client-side application, or a hybrid server-side/client-side application that is cooperatively executed by one or more of client applications 22, 24, 26, 28, 66 and/or presentation process 10.

One or more of client applications 22, 24, 26, 28, may be configured to effectuate some or all of the functionality of content presentation application 20 (and vice versa). Accordingly, content presentation application 20 may be a purely server-side application, a purely client-side application, or a hybrid server-side/client-side application that is cooperatively executed by one or more of client applications 22, 24, 26, 28 and/or content presentation application 20. As one or more of client applications 22, 24, 26, 28, presentation process 10, and content presentation application 20, taken singly or in any combination, may effectuate some or all of the same functionality, any description of effectuating such functionality via one or more of client applications 22, 24, 26, 28, presentation process 10, content presentation application 20, or combination thereof, and any described interaction(s) between one or more of client applications 22, 24, 26, 28, presentation process 10, content presentation application 20, or combination thereof to effectuate such functionality, should be taken as an example only and not to limit the scope of the disclosure.

Users 46, 48, 50, 52 may access computing device 12 and presentation process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Presentation process 10 may include one or more user interfaces, such as browsers and textual or graphical user interfaces, through which users 46, 48, 50, 52 may access presentation process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection.

Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-13, presentation process 10 may receive 200 a presentation file including one or more audio portions and one or more textual portions. An audio transcript of the one or more audio portions of the presentation file may be generated 202. A textual transcript of the one or more textual portions of the presentation file may be generated 204. One or more rich portions of the presentation file may be determined 206 based upon, at least in part, a comparison of the audio transcript and the textual transcript. At least the one or more rich portions of the presentation file may be presented 208.

In some implementations consistent with the present disclosure, systems and methods may be provided for allowing users to watch a video presentation without missing content that is spoken but not written. In an illustrative example, a presentation may include various slides or pages that may be presented to a user. The presentation may include a speaker who presents the slides or pages to the user. During the presentation, the speaker may recite the content from the presentation (e.g., slides or pages), the speaker may expound on the content from the presentation, and/or the speaker may speak on other content not mentioned in the presentation.

The presentation may be recorded as an audio and/or video presentation file for users to watch/listen to subsequent to the presentation. When accessing the presentation file, a user may not know which slides or pages are key parts and may have to go through the audio and/or video presentation from start to end. This may waste a lot of time as a user may feel like he or she needs to watch the entire presentation because, if the user were to skip some parts, he or she may miss important information spoken in the audio and/or video presentation file. In some implementations, the user may wish to fast forward to the "interesting" or "rich" parts of the presentation. On average, a person may require about twice as much time to listen to a book than to read it. In this case, a user could spend at most 15 minutes on a 30 minute slide presentation, unless there is something said in the audio and/or video presentation that is not included in slide presentation.

In some implementations, a user may desire to skip to and watch/listen to the rich portions at a normal playback rate of the presentation file and/or read the non-rich portions (e.g., which may include the content that is included in the slides) at a an accelerated playback rate. In some other embodiments, a user may wish to skip the non-rich portions to instead watch only the rich portions of the presentation file. As such, a user may view the same presentation file at an accelerated pace without missing any rich content (e.g., which may include content that may not be directly included in the slides).

As generally discussed above with reference to FIGS. 2 and 3, presentation process 10 may receive 200 a presentation file including one or more audio portions and one or more textual portions. In some implementations, a presentation file 300 may generally include a recording or other representation of a presentation which may include one or more audio portions and/or one or more textual portions. In some implementations, a presentation file may be created and/or recorded from a presentation of content. In some implementations, the presentation file 300 may include at least one presentation file, and/or more than one presentation file. For example, the presentation file may include a video presentation file 302 (and/or only an audio presentation file) and/or one or more textual portions 304 (e.g., slides or pages of the presentation).

A video presentation file 302 may include a video of one or more textual portions of a presentation (e.g., slides, images, and/or pages of the presentation). The video presentation file may include one or more audio portions of the presentation 306 (e.g., audio of one or more speakers presenting the presentation). In some implementations, the video presentation file may include a video of the one or more textual portions 308 and one or more audio portions 306. In some implementations, the one or more audio portions may be associated with the one or more textual portions. For example, one or more speakers may display slides of a presentation (e.g., one or more textual portions of the presentation). During the display of a slide of the presentation, the one or more speakers may discuss the content of the slide and/or may discuss content that may not be written in or on the slide that may be recorded for audio playback of the presentation file (e.g., one or more audio portions of the presentation). As such, the one or more audio portions 306 may include the recorded audio during the display of the one or more textual portions 308. As will be discussed in greater detail below, a presentation file may include an audio portion for every textual portion (e.g., content spoken about a slide while a slide is being displayed). While a video presentation file has been discussed, it will be appreciated that audio presentation files and other presentation files may be recorded and received by presentation process 10 within the scope of the present disclosure. In some implementations, the presentation file may be received via a user interface, may be streamed and/or downloaded from a network and/or the Internet, may be read and/or copied from a storage device, etc.

In some implementations, presentation process 10 may generate 202 an audio transcript of the one or more audio portions of the presentation file. An audio transcript 310 may generally include a textual representation of words, phrases, sentences, etc. spoken by a presenter during the presentation. As will be discussed in greater detail below, presentation process 10 may record one or more words (e.g., keywords) of the one or more audio portions in a database or data store. In some implementations, presentation process 10 may use a speech-to-text (STT) system to generate the audio transcript 310 based upon, at least in part, the one or more audio portions 306. An example STT system may include, but is not limited to, the IBM® Speech to Text service. (IBM is a registered trademark of International Business Machines Corporation in the United States, other countries or both). The IBM® Speech to Text service may provide an Application Programming Interface (API) that may add speech transcription capabilities to applications. To transcribe the human voice accurately, the Speech to Text service may leverage machine intelligence to combine information about grammar and language structure with knowledge of the composition of the audio signal. The Speech to Text service may continuously return and retroactively update the transcription as more speech is heard. It will be appreciated that other STT systems are available and within the scope of the present disclosure. In some implementations, generating the audio transcript 310 may include transcribing any audio portions into a text representation of the one or more audio portions 306 of the presentation file 300.

In some implementations, generating 202 the audio transcript of the one or more audio portions may include associating 210 the one or more audio portions of the presentation file with the one or more textual portions of the presentation file. As will be discussed in greater detail below, in some situations the one or more audio portions 306 may not be defined or pre-apportioned by slide in the presentation file 300. For example, the presentation file 300 may include a video 302 of the one or more textual portions 304 (e.g., slides or pages) with an audio recording of a speaker's comments during each slide. However, within the presentation file 300, individual portions of the audio recording 306 may not associated with each particular slide 304. In other words, the presentation file 300 may or may not associate 210 the audio spoken during the display of a slide in a video with slide. As such, in some implementations, presentation process 10 may generally associate 210 one or more audio portions 306 of an audio recording with the one or more textual portions 304 (e.g., slides or pages) of the presentation file.

Figure 3:
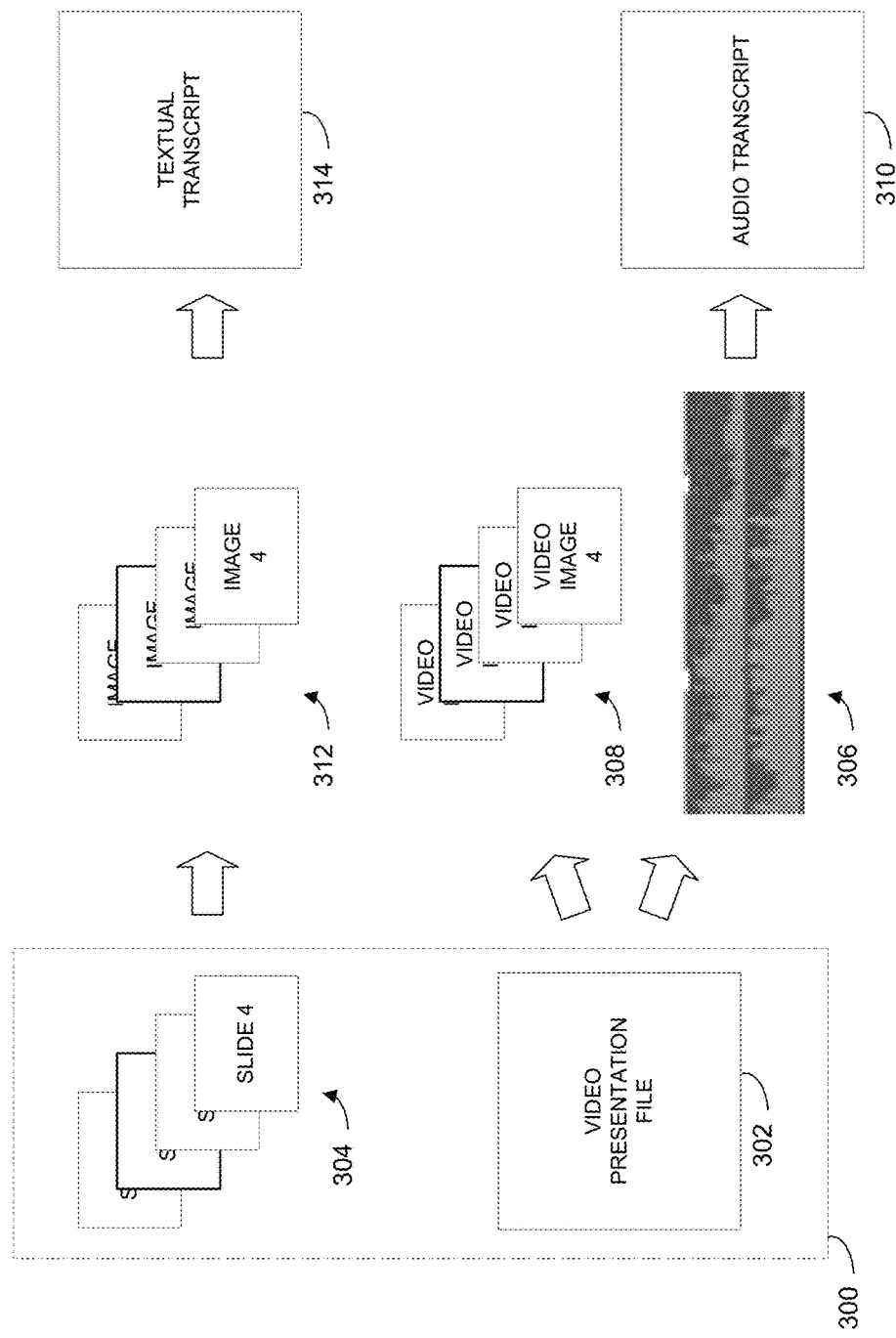
FIG. 3 is an example presentation file received by the presentation process of FIG. 1 according to one or more example implementations of the disclosure.
Figure 4:
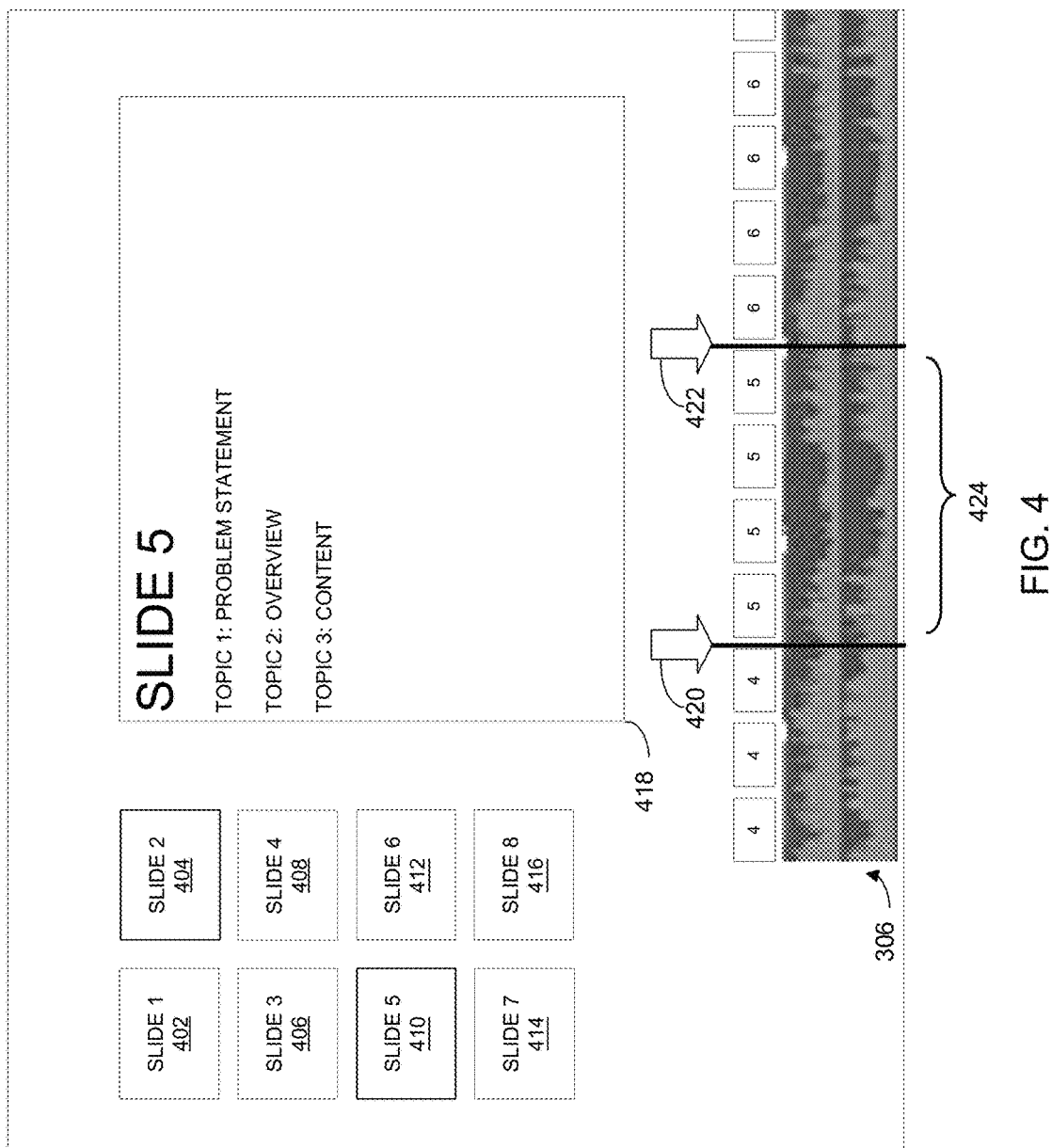
FIG. 4 is an example diagrammatic view of a user interface used for various features of presentation process according to one or more example implementations of the disclosure.

Referring also to the example of FIGS. 3-4, presentation process 10 may receive 200 a presentation file at a user interface (e.g., user interface 400). The presentation file may include a video presentation file (e.g., video presentation file 302), one or more audio portions (e.g., audio recording 306), and/or one or more textual portions (e.g., textual portions 402, 404, 406, 408, 410, 412, 414, 416). In some implementations, presentation process 10 may generate one or more video-converted images (e.g., video-converted images 308) from the video presentation file (e.g., video presentation file 302). A video-converted image may generally include an image or screenshot of the video presentation file. In some implementations, a video-converted image may be generated by periodically (e.g., every second) capturing a screenshot of the video. As will be described in greater detail below, the one or more video-converted images (e.g., video-converted images 308) may be used to compare the video presentation file (e.g., video presentation file 302) with the one or more textual portions (e.g., textual portions 402, 404, 406, 408, 410, 412, 414, 416).

As discussed above and in some implementations, the video presentation file 302 may not associate 210 the one or more audio portions (e.g., audio recording 306) of the video presentation file with the one or more textual portions (e.g., textual portions 402, 404, 406, 408, 410, 412, 414, 416) within the video presentation file. As will be discussed in greater detail below, presentation process 10 may associate 210 the one or more audio portions (e.g., portions of the audio recording 306) with the one or more textual portions (e.g., textual portions 402, 404, 406, 408, 410, 412, 414, 416) of the presentation file to define the audio portions (e.g., audio recording portions) that are spoken during the display of the one or more textual portions (e.g., slides) in the video presentation file.

Figure 5:
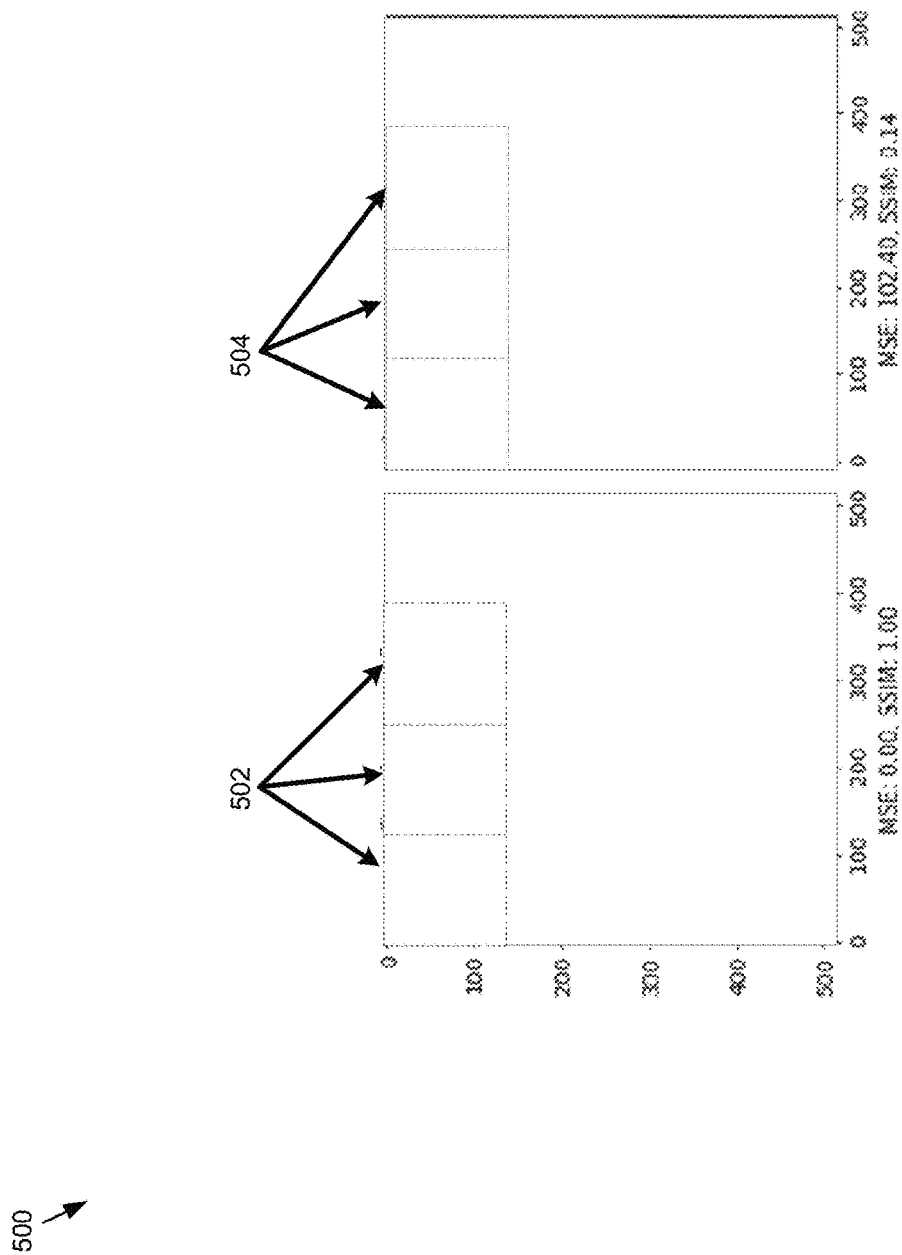
FIG. 5 is an example diagrammatic view of grid-based image comparison according to one or more example implementations of the disclosure.

Referring also to FIG. 5 and in some implementations, presentation process 10 may use scaled-grid-based picture comparison to associate 210 one or more video-converted images of the presentation file with the one or more textual portions of the presentation file. For example, grid-based image comparison may generally include comparing one or more grids (e.g., grids 502, 504) from different images to determine how similar the images are to each other. As will be discussed in greater detail below, presentation process 10 may determine page or slide number(s) associated with the one or more video-converted images of the presentation file. For example, presentation process 10 may save the one or more textual portions (e.g., textual portions 402, 404, 406, 408, 410, 412, 414, 416) of the presentation file as one or more images 312 Presentation process 10 may compare the video-converted images (e.g., video-converted images 308) of the video presentation file (e.g., video presentation 302) with the one or more saved textual portion images 312 at a pre-defined time interval (e.g., every second). Presentation process 10 may calculate the scaled-grid-based similarity between the video-converted images (e.g., video-converted images 308) of the video presentation file (e.g., video presentation 302) with the one or more saved textual portion images (e.g., saved textual portion images 312). In some implementations, calculating the scaled-grid-based similarity between the video-converted image of the video presentation file with the saved one or more textual portion images may include scaling the images (e.g., video-converted images 308 and saved textual portion images 312) to the same width and height. Presentation process 10 may calculate a grid average for each image. Presentation process 10 may calculate a distance between the grid averages and may associate the video-converted image of the video presentation file with the saved one or more textual portion based on a most-similar strategy.

For example, suppose presentation process 10 is comparing at least the video-converted image of "SLIDE 5" 418 with the one or more saved textual portion images (e.g., saved textual portion images 312). Presentation process 10 may calculate a grid average for each image. Based upon a distance between the grid averages (e.g., a closest or smallest distance), presentation process 10 may associate the video-converted image (e.g., video-converted image of "SLIDE 5" 418) with one or more textual portions (e.g., textual portion "SLIDE 5" 410). In some implementations, presentation process 10 may mark the video-converted image with an identifier (e.g., a page or slide number) associating the video-converted image with the one or more textual portions.

In some implementations, presentation process 10 may associate 210 the one or more audio portions with the one or more textual portions based upon, at least in part, a page or slide number associated with the one or more textual portions. For example and as discussed above, presentation process 10 may determine which portions of the video presentation file are associated with the one or more textual portions (e.g., video-converted image of "SLIDE 5" 418 is associated with textual portion "SLIDE 5" 410). Presentation process 10 may determine which audio portions are spoken by a presenter during the presentation of the video-converted image of the video presentation. For example and in response to associating video-converted image of "SLIDE 5" 418 with textual portion "SLIDE 5" 410, presentation process 10 may determine one or more audio portions that are spoken by the presented during the presentation of video-converted image of "SLIDE 5" 418. In some implementations, presentation process 10 may determine that the audio portion that plays during the presentation of video-converted image of "SLIDE 5" 418 starts at a first time (starting time 420) and ends at a second time (e.g., ending time 422). As such, presentation process 10 may associate 210 the one or more audio portions (e.g., audio portion 424) with the one or more textual portions (e.g., textual portion "SLIDE 5" 410).

In some implementations, associating 210 the one or more textual portions with the one or more audio portions may include appending the audio transcript with an identifier (e.g., a page number or slide number) associated with the one or more textual portions. Returning to the above example of "SLIDE 5", presentation process 10 may append or embed the identifier (e.g., page number or slide number) associated with the one or more textual portions (e.g., page 5) to the audio transcript to associate 210 the one or more audio portions in the audio transcript (e.g., audio portions converted to text) with the one or more textual portions.

In some implementations, generating 202 the audio transcript of the one or more audio portions may include extracting 212 one or more words from the one or more audio portions based upon, at least in part, the textual portion of the presentation file associated with the one or more audio portions. In some implementations and as discussed above, the audio transcript 310 may generally include and/or may be linked to and/or be associated with a database or data store for one or more words (e.g., keywords). A keyword may generally refer to a word recognized by presentation process 10 and transcribed into text. In some implementations, the keywords may include a subset of possible words. For example, the one or more keywords may include nouns or other specific groups of words. In some implementations, presentation process 10 may include a ruleset for extracting one or more words (e.g., keywords) from the one or more audio portions.

For example, presentation process 10 may extract 212 one or more words from the one or more audio portions if a word is repeated a pre-defined number of times over a pre-defined period of time (e.g., common word repeated at least three times in two minutes). Presentation process 10 may extract 212 one or more words from the one or more audio portions if an emphasis word (e.g. "core", "conclusion", "important", "emphasize", "priority", etc.) is identified in the one or more audio portions. Presentation process 10 may extract one or more words from the one or more audio portions if a voice tone of the presenter(s) changes. Presentation process 10 may extract 212 one or more words from the one or more audio portions if a stop period (e.g., three seconds~ten seconds) is identified between two common sentences. For example, a speaker may emphasize an important point in a presentation by pausing for a brief period after making the point (e.g., a stop period of three to ten seconds). Presentation process 10 may extract 212 the one or more words from the one or more audio portions spoken by the speaker before the stop period.

In some implementations, presentation process 10 may determine and/or recognize one or more concepts in the one or more audio portions of the presentation file. A concept may generally refer to a topic or theme of the one or more audio portions that may or may not be directly referenced in the text. For example, analysis of an article about "BMW", "Audi", and "Porsche" by presentation process 10 may return the "Automotive Industry" concept. It will be appreciated that other concepts may be determined and/or recognized by presentation process 10. In some implementations, presentation process 10 may record the concept associated with the one or more audio portions of the presentation file in the audio transcript.

In some implementations, presentation process 10 may recognize one or more individual speakers in the one or more audio portions. For example, a presentation file may include an audio recording from a panel of presenters. The plurality of presenters may speak during different textual portions of the presentation (e.g., different slides of the presentation) and/or may speak in groups. For example, a panel of presenters may each weigh in on subject while a particular slide is displayed. In some implementations, presentation process 10 may determine or recognize when multiple speakers are speaking during the one or more audio portions of the presentation file. In some implementations, presentation process 10 may determine how many presenters of a plurality of presenters are speaking during one or more audio portions. This number of presenters may be recorded in the audio transcript. In some implementations, and as will be discussed in greater detail below, the number of speakers in audio portion may indicate a greater level of interest for users when watching the presentation file. For example, suppose a user asks a question during the presentation and that the presenter answers the question. Presentation process 10 may determine that two speakers were identified during this audio portion. As will be discussed in greater detail below, the audio portion including the question and answer may include content that may be of interest to other users and/or viewers of the presentation file.

In some implementations, presentation process 10 may include a system or application to extract 212 the one or more words (e.g., keywords) from the one or more audio portions. For example, presentation process 10 may utilize the AlchemyLanguage® API of IBM® Watson®. (IBM, Watson, and AlchemyLanguage are registered trademarks of International Business Machines Corporation in the United States, other countries or both). AlchemyLanguage® is a collection of APIs that can offer text analysis through natural language processing. This set of APIs can analyze text to understand its concepts, entities, keywords, sentiment, and more. In some implementations, these systems and/or applications may include their own rulesets for identifying and extracting the one or more words (e.g., keywords) from the one or more audio portions.

Figure 6:
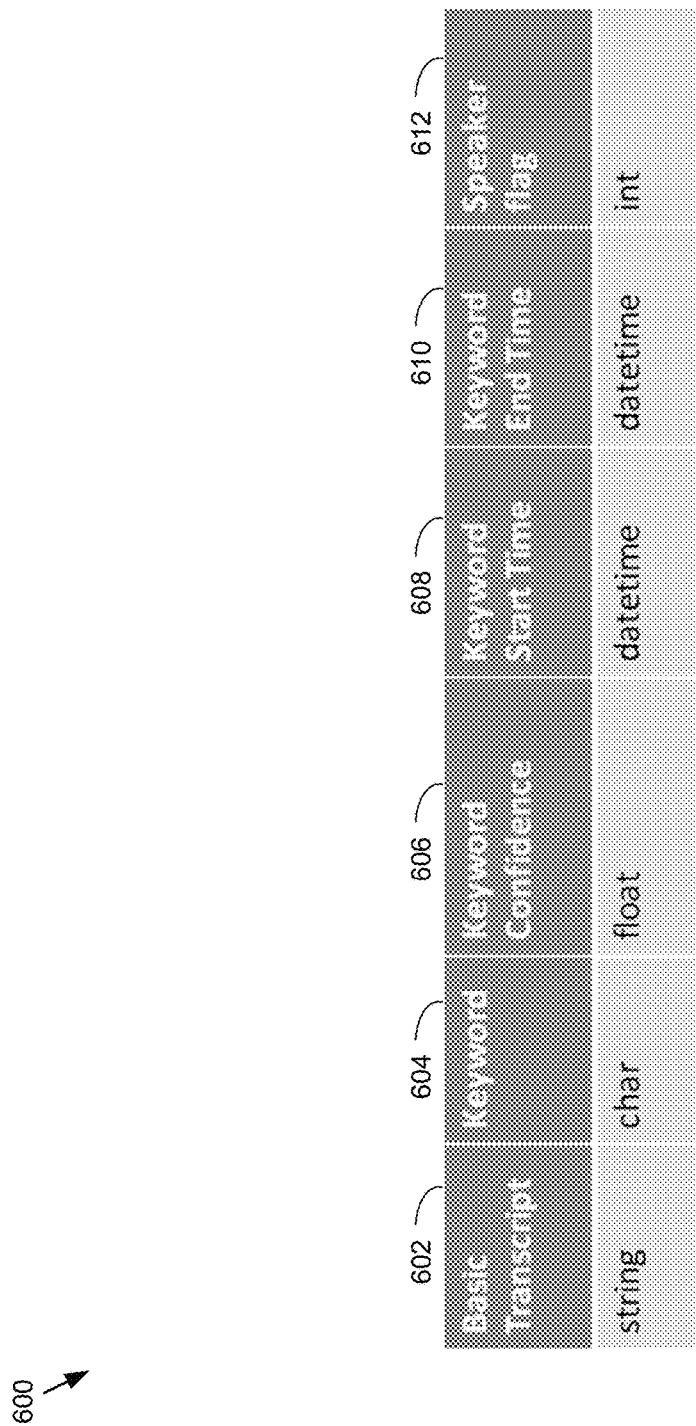
FIG. 6 is an example database format for an audio transcript and/or a database in communication with the audio transcript according to one or more example implementations of the disclosure.

Referring also to FIG. 6 and in response to extracting 212 the one or more words (e.g., keywords) from the one or more audio portions, presentation process 10 may record the one or more words and a corresponding timestamp from the one or more audio portions in the audio transcript. In some implementations, the database structure for the audio transcript 600 may include a basic transcription 602 of the one or more audio portions, one or more keywords 604, a confidence metric 606 associated with each keyword, a keyword start time 608, a keyword end time 610, and/or a speaker flag 612. In some implementations, an entry may be created in the database for each keyword and/or every time a keyword has a new start time and/or end time. For example, a keyword may be repeated in the one or more audio portions and as such may be recorded as two separate entries in the audio transcript with different start times and/or end times. As will be discussed in greater detail below, presentation process 10 may compare the one or more words from the audio transcript against one or more words from a textual transcript to determine one or more rich portions of the presentation file.

In some implementations, presentation process 10 may generate 204 a textual transcript of the one or more textual portions of the presentation file (e.g., the presentation slides or other textual content that may have been displayed during the presentation). In some implementations, the textual transcript 314 of the one or more textual portions of the presentation file may generally include a textual representation of the content of the one or more textual portions of the presentation file. In some implementations, the textual transcript may include the content of the one or more textual portions of the presentation by textual portion. For example, the contents of a first textual portion (e.g., "SLIDE 1" 402) may be included in the textual transcript separately from a second textual portion (e.g., "SLIDE 2" 404). In this way, presentation process 10 may determine which content in the textual transcript is associated with which textual portion. As will be discussed in greater detail below, presentation process 10 may compare the textual transcript and the audio transcript to determine one or more rich portions of the presentation file. For example, the comparison of the textual transcript and the audio transcript may include a comparison of the content of the textual transcript associated with a textual portion and the content of the audio transcript for an audio portion associated with the same textual portion. As such, in some embodiments that content of the textual portion of the presentation may be compared with the content of the corresponding audio portion of the presentation.

In some implementations, generating 204 the textual transcript of the one or more textual portions may include extracting 214 one or more words from the one or more textual portions. For example and as discussed above, the textual transcript may include the content of the one or more textual portions. In some implementations, the content may include one or more words (e.g., keywords) extracted 214 from the one or more portions. As discussed above, a keyword may generally refer to a word recognized by presentation process 10 and extracted into a textual transcription. In some implementations, the keywords may include a subset of possible words. For example, the one or more keywords may include nouns or other specific groups of words. In some implementations, presentation process 10 may include a ruleset for extracting one or more words (e.g., keywords) from the one or more textual portions.

For example, presentation process 10 may extract 214 one or more words if a word is repeated a pre-defined number of times over a pre-defined period of time (e.g., common word repeated at least three times in two minutes). Presentation process 10 may extract one or more words if an emphasis word (e.g. "core", "conclusion", "important", "emphasize", "priority", etc.) is identified in the one or more textual portions.

In some implementations, presentation process 10 may determine and/or recognize one or more concepts in the one or more textual portions of the presentation file. As discussed above, a concept may generally refer to a topic or theme of the one or more audio portions that may or may not be directly referenced in the text. In some implementations, presentation process 10 may record the concept associated with the one or more textual portions of the presentation file in the textual transcript.

In some implementations, presentation process 10 may include a system or application to extract the one or more words (e.g., keywords) from the one or more textual portions. For example, presentation process 10 may utilize the AlchemyLanguage® API of IBM® Watson® to extract the one or more words from the one or more textual portions of the presentation file.

Figure 7:
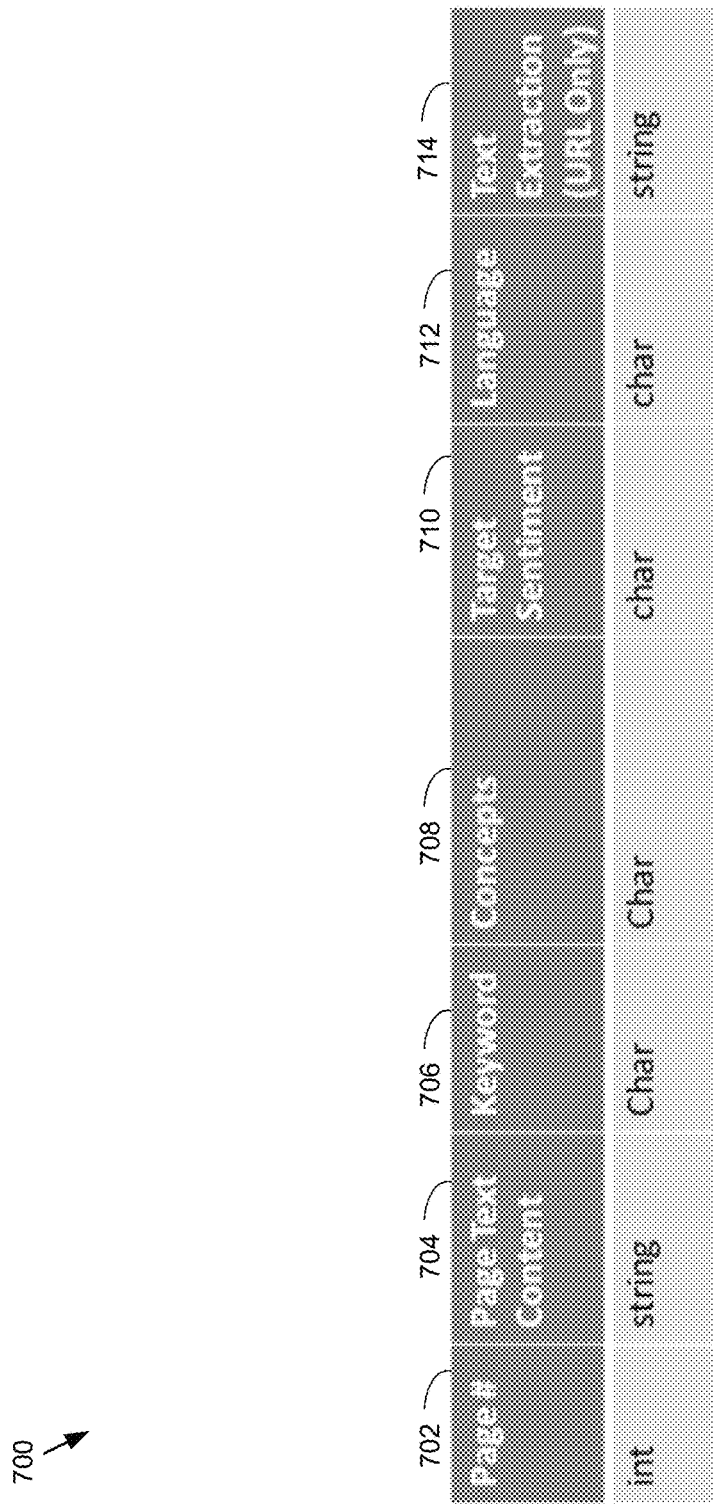
FIG. 7 is an example database format for an textual transcript and/or a database in communication with the textual transcript according to one or more example implementations of the disclosure.

Referring also to FIG. 7 and in response to extracting 214 the one or more words (e.g., keywords) from the one or more textual portions, presentation process 10 may record the one or more words in the textual transcript. In some implementations, the database structure for the textual transcript 700 may include one or more page numbers 702, page text content 704, one or more keywords 706, one or more concepts associated with the one or more keywords 708, a target sentiment metric associated with the one or more keywords 710, a language (e.g., "English", "French", "Mandarin", etc.) associated with the textual portion 712, and/or text extraction information 714 (e.g., important information from a webpage, removing navigation links, advertisements, and other undesired content (if applicable)). In some implementations, an entry may be created in the database for each keyword.

Figure 8:
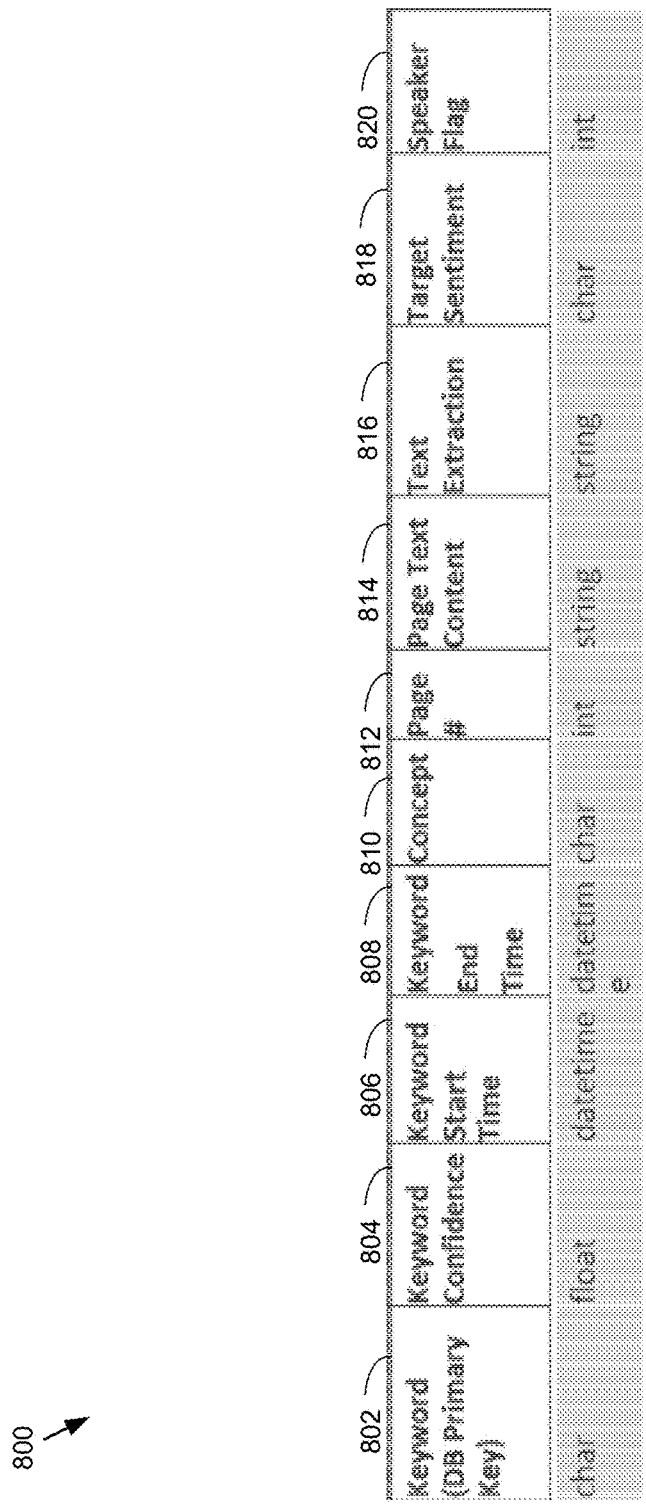
FIG. 8 is an example database format for a combined transcript database in communication with the audio transcript and the textual transcript according to one or more example implementations of the disclosure.

Referring also to FIG. 8 and in some implementations, presentation process 10 may combine the audio transcript entries (e.g., database entries of FIG. 6) and the textual transcript entries (e.g., database entries of FIG. 7) to define a combined transcript database. In some implementations, the combined transcript database 800 may include one or more entries including one or more keywords 802, a keyword confidence score 804, a keyword start time 806, a keyword end time 808, one or more concepts 810, one or more page numbers 812, textual portion text content 814, extracted text 816 (e.g., important information from a webpage, removing navigation links, advertisements, and other undesired content (if applicable) related to the one or more concepts 810), target sentiment 818, and a speaker flag 820.

In some implementations, presentation process 10 may determine 206 one or more rich portions of the presentation file based upon, at least in part, a comparison of the audio transcript 310 and the textual transcript 314. In some implementations, the one or more rich portions may generally describe content that is included in the one or more audio portions of the presentation file and/or not included in the one or more textual portions of the presentation file. In some implementations, a user or participant in a presentation may learn information more quickly by reading the information than by listening to the information. In some implementations, a user may process or learn information twice as fast by reading the information rather than listening to the information. For example, a user may read at 200 words per minute and listen at 100 words per minute. As such, presentation process 10 may determine the one or more rich portions (e.g., portions of a presentation that are only spoken and/or not written) from a presentation file and present at least the one or more rich portions. In this way and as will be discussed in greater detail below, presentation process 10 may modify the presentation of presentation file and/or provide options to modify the playback of the presentation file to increase a user's cognitive efficiency when viewing the presentation file.

In some implementations, determining 206 the one or more rich portions may be based upon, at least in part, a comparison of the audio transcript 310 and the textual transcript 314. For example, content from the audio transcript 310 and content from the textual transcript 314 may be compared to determine 206 the one or more rich portions. As discussed above and in some implementations, content that is unique to the audio transcript may be determined to be a rich portion.

In some implementations, determining 206 the one or more rich portions may include comparing 216 the one or more words from the audio transcript 310 and the one or more words from the textual transcript 314 based upon, at least in part, the one or more textual portions of the presentation file associated with the one or more audio portions of the presentation file and/or determining 218 the one or more audio portions of the presentation file that include one or more words that are not included in the associated one or more textual portions, thus defining the one or more rich portions of the presentation file. In some implementations, presentation process 10 may compare the one or more words from the audio transcript 310 and the one or more words from the textual transcript 314 for a given textual portion (e.g., slide or page) of the presentation file.

For example, presentation process 10 may compare 216 the one or more words extracted from the one or more audio portions associated with "SLIDE 5" 410 and the one or more words extracted from "SLIDE 5" 410 to determine the one or more rich portions. In some implementations, presentation process 10 may determine a number of words from the audio transcript (e.g., from one or more audio portions) associated with "SLIDE 5" 410 and may determine a number of words from the textual transcript associated with "SLIDE 5" 410. In some implementations, the words from the audio transcript may be referred to as "said" words and the one or more words from the textual transcript may be referred to as "written" words. Presentation process 10 may determine how many of the one or more words from the audio transcript and the textual transcript associated with "SLIDE 5" 410 match. In some implementations, presentation process 10 may determine a richness index based upon, at least in part, the "said" words and/or the "written" words and/or number of matching words (e.g., number of matching "said" and "written" words). For example, presentation process 10 may compare the "said" words and/or the "written" words and/or number of matching words as shown below in Equation 1.

$$\text{rich1} = \text{said} - (\text{written} \cap \text{said}) \tag{1}$$

where rich1 represents the richness index of a given textual portion (e.g., slide), said represents the one or more words from the one or more audio portions associated with the given textual portion, written represents the one or more words from the textual transcript, and $\cap$ represents the intersection of the written and said words (e.g., matching words).

As can be seen from Equation 1, the richness index may be determined for the "said" and "written" words of a given textual portion of the presentation file. In some implementations, content (e.g., one or more words) spoken by a presenter may not be written in the textual portion associated with the audio portion. As such and based on Equation 1, these "said" words may not be found in the "written" words of a given textual portion (e.g., slide or page) and may obtain a high richness score even though, for example, a different textual portion may include the "said" words. As such, presentation process 10 may compare the "said" words associated with a given textual portion and/or the "written" words with all of the textual portions of the presentation file and/or number of matching words across as shown below in Equation 2.

$$\text{rich2} = \text{said} - (\text{written}_{all} \cap \text{said}) \tag{2}$$

where rich2 represents the richness index of a given textual portion (e.g., slide), said represents the one or more words from the one or more portions audio portions associated with the given textual portion, written$_{all}$ represents the one or more words from every textual portion, and n represents the intersection of the written and said words (e.g., matching words).

In some implementations, the rich1 index and the rich2 index may be averaged to obtain the richness index as shown below in Equation 3.

$$richness = \frac{rich1 + rich2}{2 * said} \quad (3)$$

Figure 9:
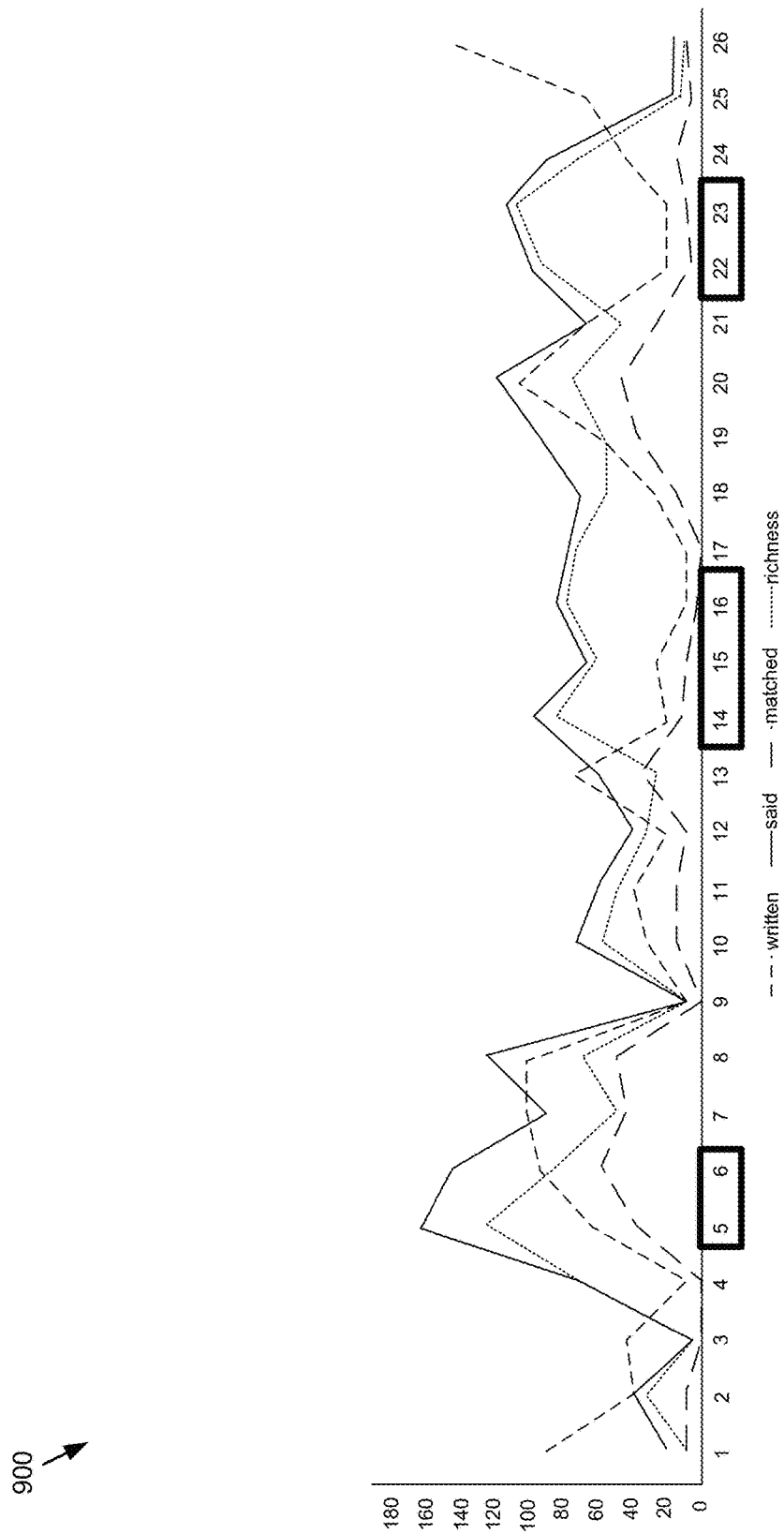
FIG. 9 is an example graph of a richness index for an example presentation file according to one or more example implementations of the disclosure.

Referring also to the example of FIG. 9, an example presentation file was received by presentation process 10 and an audio transcript and a textual transcript were generated. Based upon, at least in part, a comparison of the audio transcript and the textual transcript, the sample richness indexes were determined for the twenty six slides of the presentation file. As can be seen from FIG. 9, slides 5-6, 14-16, and 22-23 of this example presentation file may include higher levels of richness (e.g., a higher richness index) and may therefore be one or more rich portions of the presentation file. As discussed above, the higher richness index may indicate that these slides are associated with one or more audio portions of the presentation file that include content that may not be included in written text of the slides.

In some implementations, presentation process 10 may determine 218 the one or more rich portions based upon, at least in part, a comparison of the audio transcript and the textual transcript and a threshold richness index. A threshold richness index may generally refer to a threshold richness index that determines which textual portions are rich and which textual portions are not rich or non-rich portions. For example and referring again to FIG. 9, presentation process 10 may define a threshold richness index of e.g., 80. In this example, presentation process 10 may determine the one or more rich portions of the presentation file based upon, at least in part, the threshold richness index of e.g., 80. As such, textual portions of the presentation file with a richness index of e.g., 80 or greater may be determined to be a rich portion while those textual portions with a richness index of less than e.g., 80 may be determined to be a non-rich portion. It will be appreciated that other threshold richness indexes are possible and are within the scope of the present disclosure.

In some implementations, determining 206 the one or more rich portions may include recognizing 220 at least one of one or more concepts and one or more speakers in the one or more audio portions of the presentation file. As discussed above and in some implementations, presentation process 10 may determine or recognize one or more concepts in the one or more audio portions and/or the one or more textual portions of the presentation file. In some implementations, presentation process 10 may determine a richness index associated with the one or more concepts of the one or more audio portions and/or the one or more textual portions of the presentation file. For example, presentation process 10 may compare the "said" concepts and/or the "written" concepts and/or number of matching concepts as shown below in Equation 4.

$$rich1_{concept} = said_{concept} - (Written_{concept} \cap Said_{concept}) \quad (4)$$

where rich1$_{concept}$ represents the richness index of a given textual portion (e.g., slide) based on the concept, said$_{concept}$ represents the one or more concepts from the one or more audio portions associated with the given textual portion, written$_{concept}$ represents the one or more concepts from the textual transcript, and n represents the intersection of the written and said concepts (e.g., matching concepts).

As can be seen from Equation 4, the richness index may be determined for the "said" and "written" concepts of a given textual portion of the presentation file. In some implementations, one or more concepts discussed by a presenter may not be written in the textual portion associated with the audio portion. As such and based on Equation 4, these "said" concepts may not be found in the "written" concepts of a given textual portion (e.g., slide or page) and may obtain a high richness score even though, for example, a different textual portion may include the "said" concepts. As such, presentation process 10 may compare the "said" concepts associated with a given textual portion and/or the "written" concepts with all of the textual portions of the presentation file and/or number of matching concepts across as shown below in Equation 5.

$$rich2_{concept} = said_{concept} - (written_{concept_{all}} \cap said_{concept}) \quad (5)$$

where rich2$_{concept}$ represents the richness index of a given textual portion (e.g., slide), said$_{concept}$ represents the one or more concepts from the one or more portions audio portions associated with the given textual portion, written$_{concept_{all}}$ represents the one or more concepts from every textual portion, and n represents the intersection of the written and said concepts (e.g., matching concepts).

In some implementations, the rich1$_{concept}$ index and the rich2$_{concept}$ index may be averaged to obtain the richness$_{concept}$ index as shown below in Equation 6.

$$richness_{concept} = \frac{rich1_{concept} + rich2_{concept}}{2 * said_{concept}} \quad (6)$$

In some implementations, presentation process 10 may determine 206 one or more rich portions of the presentation file based upon, at least in part, recognizing one or more speakers in the presentation file. For example, during a presentation, a panel of speakers may discuss a particular textual portion of the presentation file. This may indicate that this slide may be important and/or may be of interest to a user watching the presentation file later on. As discussed above, presentation process 10 may recognize and/or record a number of speakers or distinct voices in the one or more audio portions of the presentation file. In some implementations, presentation process 10 may determine a richness per speaker or presenter of the presentation file. For example, the richness per speaker may be determined based upon, at least in part, the number of times a presenter speakers for a given textual portion, the number of concepts discussed by the presenter, and/or the number of rich portions attributable to the presenter. An example of how a richness index associated with the speakers of a presentation is shown below in Equation 7.

$$richness_{speaker} = 1 - \frac{1}{\sum_{1}^{n} w_i}, w_i \geq 1 \quad (7)$$

where richness$_{speaker}$ represents the richness index of a given textual portion (e.g., slide) based on the speakers and $w_i$ represents a weight or other richness indicator attributable to each speaker.

In some implementations, presentation process 10 may determine 206 one or more rich portions of the presentation file based upon, at least in part, an integrated richness index. An integrated richness index may include one or more of the richness index associated with words of the one or more textual portions, the richness index associated with concepts of the one or more textual portions, and/or the richness index associated with speakers who speak during the one or more textual portions. An example of the integrated richness index is shown below in Equation 8.

$$IR = w_1 * richness_{word} * richness_{concept} + w_3 * richness_{speaker} \qquad (8)$$

where $richness_{word}$ represents the richness index of a given textual portion (e.g., slide) based on the words, $richness_{concept}$ represents the richness index of a given textual portion (e.g., slide) based on the concepts, $richness_{speaker}$ represents the richness index of a given textual portion (e.g., slide) based on the speakers and $w_1$, $w_2$, $w_3$ and represents a weight or other richness indicator attributable to each richness index. In some implementations, the weights of each richness index may be user-defined and/or may be pre-defined as default weights.

Figure 10:
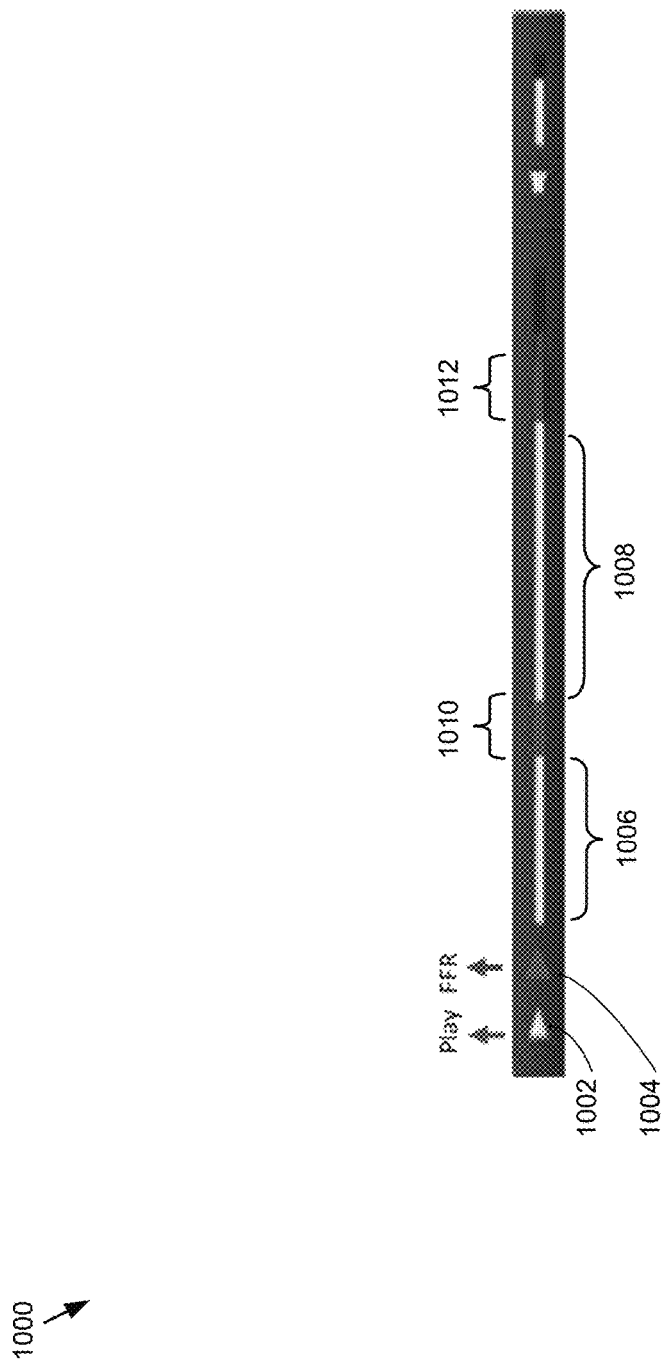
FIGS. 10-12 are example diagrammatic views of user interfaces that may used for various features of presentation process according to one or more example implementations of the disclosure.

Referring also to FIG. 10 and in some implementations, presentation process 10 may present 208 at least the one or more rich portions of the presentation file. In some implementations, presentation process 10 may provide one or more presentation and/or playback controls (e.g., playback controls 1000) for the presentation file. For example, presentation process 10 may provide playback controls 1000 with at least two buttons, one may be play button 1002 and another may be Fast Forward by Richness (FFR) play button 1004. In some implementations, selecting the play button 1002 may result in presentation process 10 playing the presentation file as the presentation file was recorded. Selecting the play button 1002 may cause the play button to be replaced with a pause button to pause the playback of the presentation file. In some implementations, selecting the FFR play button 1004 may result in presentation process 10 playing at least the rich portions of the presentation file. In some implementations, selecting the FFR play button 1004 may cause the FFR play button 1004 to be replaced with a FFR pause button to pause the playback of at least the one or more rich portions of the presentation file.

In some implementations, presenting 208 the one or more rich portions of the presentation file may include presenting 222 one or more non-rich portions of the presentation file at a first speed and presenting the one or more rich portions of the presentation file at a second speed. For example, selecting FFR play button 1004 may result in presentation process 10 playing the non-rich portions 1006, 1008 of the presentation file at a first speed and playing the one or more rich portions 1010, 1012 of the presentation file at a second speed. In some implementations that first speed may be greater than the second speed. For example and as discussed above, the one or more non-rich portions 1010, 1012 of the presentation file may generally refer to portions of the presentation file where the content spoken in the one or more audio portions is similar (e.g., based upon, at least in part, a threshold richness index) to the written content in the associated textual portions of the presentation file. In other words, the spoken content is not sufficiently different from the written content for a given slide or page of the presentation file. As discussed above, because users may generally process and learn information more quickly by reading the information than by listening to the information, presentation process 10 may present the one or more non-rich portions 1006, 1008 at an accelerated speed relative to the one or more rich portions 1010, 1012 of the presentation file.

In some implementations, presenting at least the one or more rich portions may include skipping the one or more non-rich portions 1006, 1008 of the presentation file. As discussed above, the one or more rich portions 1010, 1012 may include portions of the presentation where the content spoken for a given textual portion is not similar (e.g., based upon, at least in part, a threshold richness index) to the content written in the textual portion. As such and in some implementations, presenting at least the one or more rich portions 1010, 1012 may include skipping the one or more non-rich portions 1006, 1008. In some implementations, selecting the FFR play button 1004 may result in the presentation of the presentation file to skip to the next rich portion in the presentation file. In this way, a user may select when to skip certain non-rich portions 1006, 1008.

Figure 11:
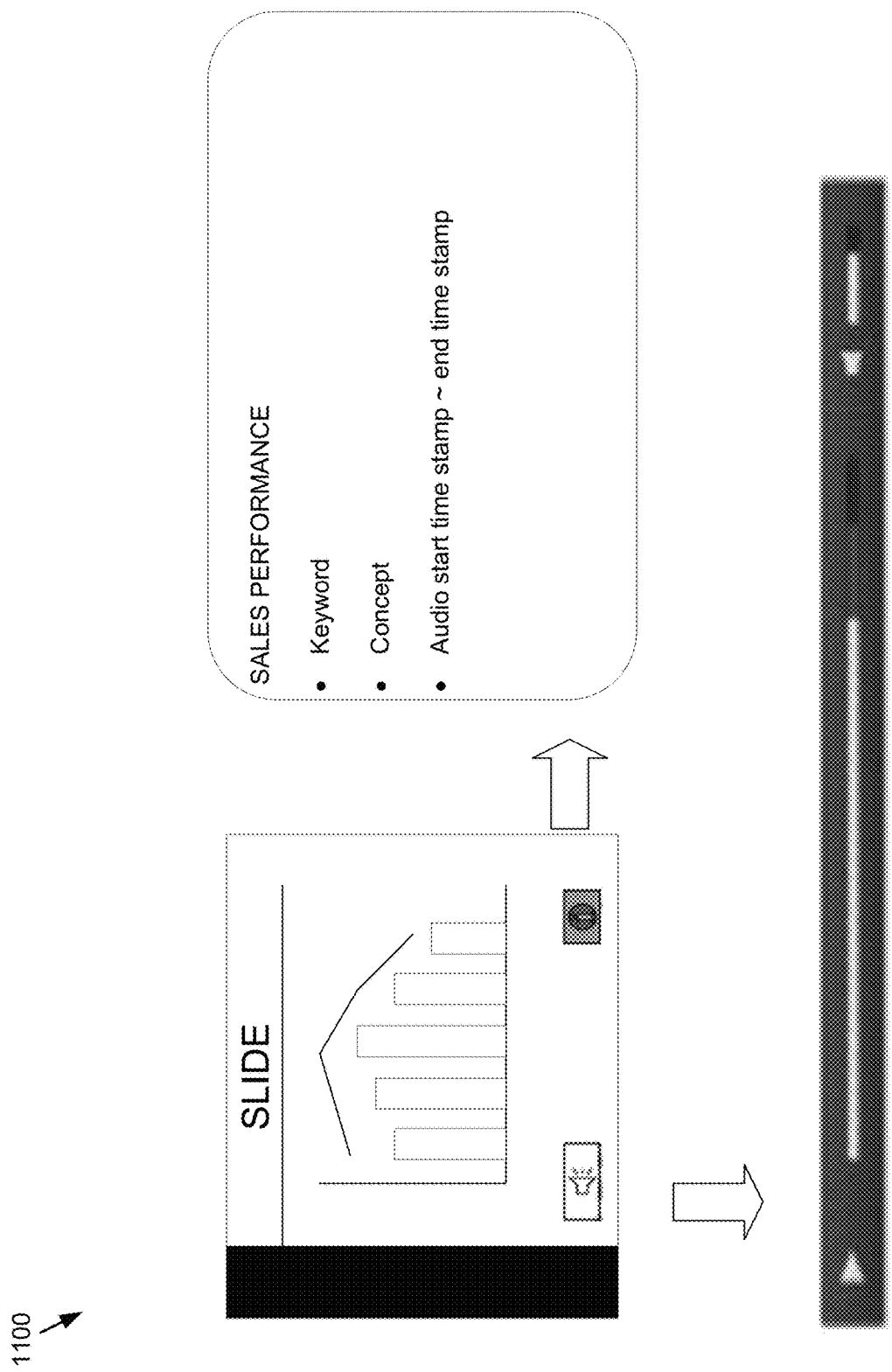

Referring also to FIG. 11 and in some implementations, presentation process 10 may generate a textual portion summary including one or more keywords, one or more concepts, and/or one or more audio portions of the presentation file associated with each textual portion. For example, presentation process 10 may split the audio recording into the one or more audio portions associated with the one or more textual portions of the presentation file. In some implementations, the textual portion summary may include the audio portion start timestamp and end timestamp associated with a given textual portion.

Figure 12:
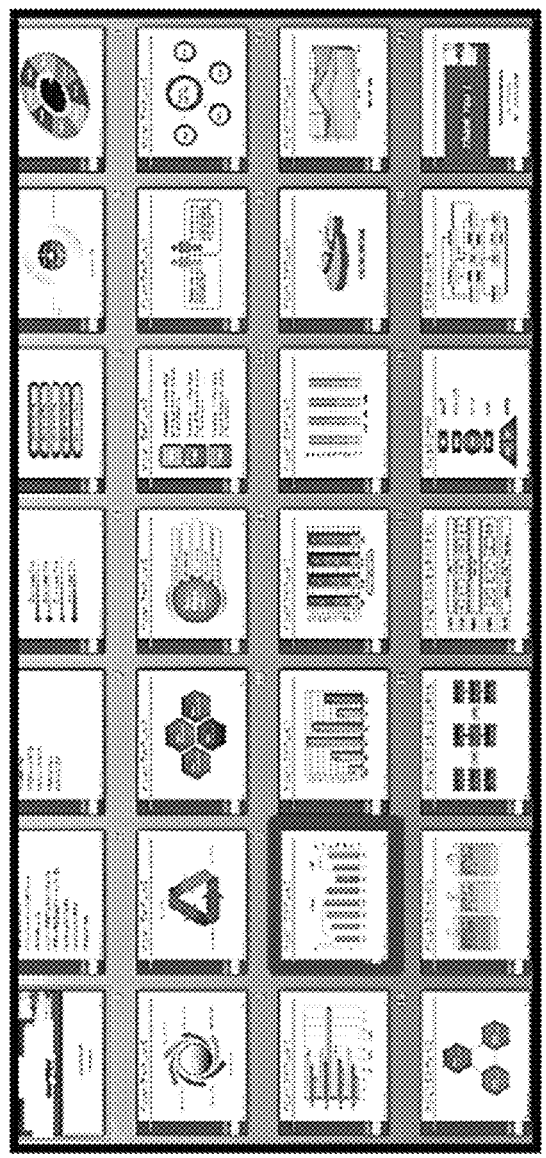
Figure 12:
Figure 12:
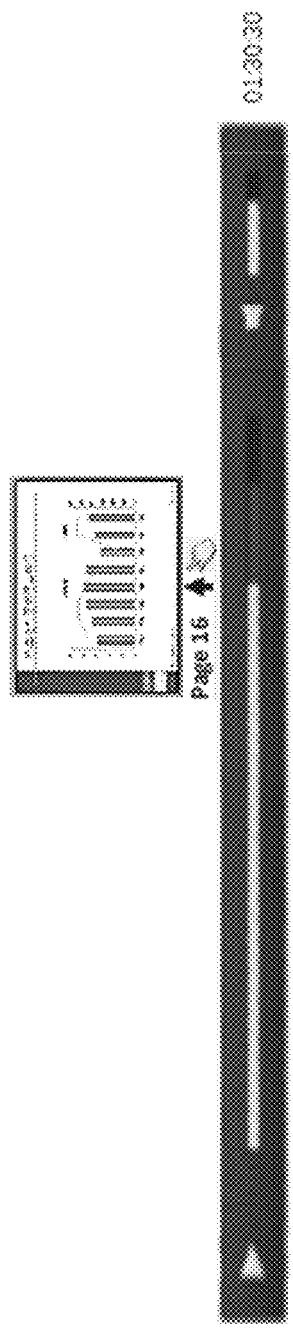

Referring also to FIG. 12 and in some implementations, presentation process 10 may provide a textual portion (e.g., slide or page number) while presenting the presentation file. For example, if a user desires to play the audio recording of the presentation file and places a cursor on a progress bar, presentation process 10 may display which textual portion and summary is associated with the audio currently being played.

In some implementations, presentation process 10 may include keyword search functionality to search for the one or more rich and/or non-rich portions of the presentation file that include and/or discuss the searched keyword.

Figure 13:
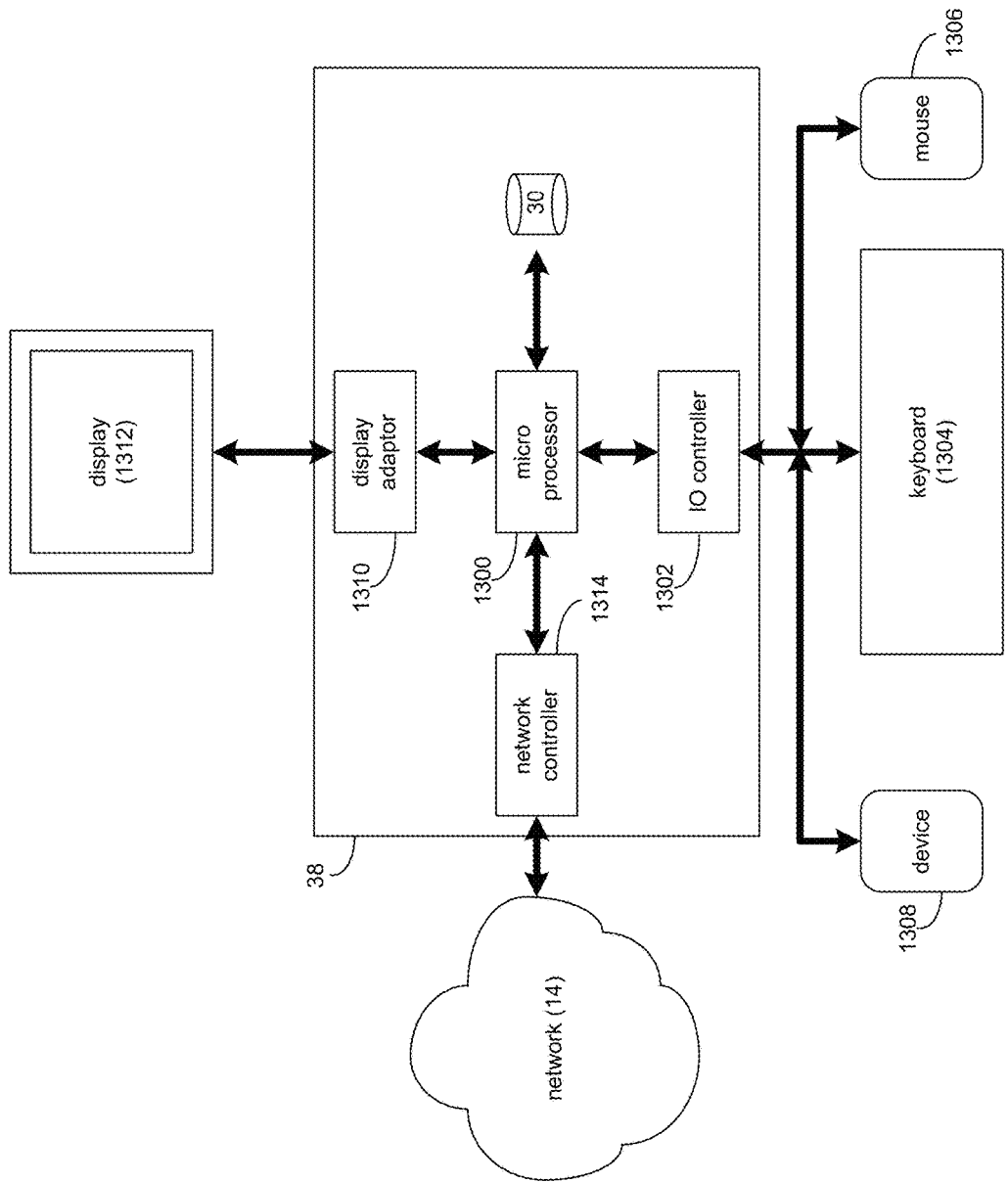
FIG. 13 is an example diagrammatic view of a client electronic device of FIG. 1 according to one or more example implementations of the disclosure.

Referring also to FIG. 13, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, presentation process 10 may be substituted for client electronic device 38 within FIG. 13, examples of which may include but are not limited to computing device 12 and/or client electronic devices 40, 42, 44.

Client electronic device 38 may include a processor and/or microprocessor (e.g., microprocessor 1300) configured to, e.g., process data and execute the above-noted code/instruction sets and subroutines. Microprocessor 1300 may be coupled via a storage adaptor (not shown) to the above-noted storage device(s) (e.g., storage device 30). An I/O controller (e.g., I/O controller 1302) may be configured to couple microprocessor 1300 with various devices, such as keyboard 1304, pointing/selecting device (e.g., mouse 1306), custom device, such a microphone (e.g., device 1308), USB ports (not shown), and printer ports (not shown). A display adaptor (e.g., display adaptor 1310) may be configured to couple display 1312 (e.g., CRT or LCD monitor(s)) with microprocessor 1300, while network controller/adaptor 1314 (e.g., an Ethernet adaptor) may be configured to couple microprocessor 1300 to the above-noted network 14 (e.g., the Internet or a local area network).

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, at a computing device, a presentation file, the presentation file including textual portions displayable via a slide-sharing application and audio portions provided by a speaker who recites the textual portions, expounds upon the textual portions, and speaks on content not provided in the textual portions of the presentation file,
   wherein each textual portion of the presentation file is associated with one audio portion of the audio portions of the presentation file,
   wherein at least one other audio portion of the audio portions of the presentation file includes content spoken by the speaker and does not have a corresponding textual portion in the presentation file, the other audio portion, including content spoken by the speaker and not having a corresponding textual portion in the presentation file, being a rich portion of the presentation file;
   generating an audio transcript of the presentation file, using an automatic speech-to-text (STT) system, from the audio portions of the presentation file;
   generating a textual transcript of the textual portions of the presentation file;
   determining one or more rich portions of the presentation file based upon, at least in part, a comparison of the audio transcript and the textual transcript,
   wherein determining the one or more rich portions includes:
   comparing words of the audio transcript with words of the textual transcript;
   determining each rich portion as a portion of the presentation file where an audio portion of the presentation file yields an audio transcript that includes one or more words that are not included in the textual transcript;
   determining non-rich portions of the presentation file as portions where words of the audio transcript have corresponding words in the textual transcript; and
   presenting, on a display via a user interface, one or more playback controls configured to present the one or more non-rich portions at an accelerated speed relative to the one or more rich portions of the presentation file.

2. The computer-implemented method of claim 1, wherein the presentation file comprises presentation slides and other textual content displayed during the presentation.

3. The computer-implemented method of claim 1, wherein determining the one or more rich portions includes recognizing at least one of one or more concepts and one or more speakers in the one or more audio portions of the presentation file.

4. A computer program product comprising a non-transitory computer readable storage medium having a plurality of instructions stored thereon, which, when executed by a processor, cause the processor to perform operations comprising:
   receiving, at a computing device, a presentation file, the presentation file including textual portions displayable via a slide-sharing application and audio portions provided by a speaker who recites the textual portions, expounds upon the textual portions, and speaks on content not provided in the textual portions of the presentation file,
   wherein each textual portion of the presentation file is associated with one audio portion of the audio portions of the presentation file,
   wherein at least one other audio portion of the audio portions of the presentation file includes content spoken by the speaker and does not have a corresponding textual portion in the presentation file, the other audio portion, including content spoken by the speaker and not having a corresponding textual portion in the presentation file, being a rich portion of the presentation file;
   generating an audio transcript of the presentation file, using an automatic speech-to-text (STT) system, from the audio portions of the presentation file;
   generating a textual transcript of the textual portions of the presentation file;
   determining one or more rich portions of the presentation file based upon, at least in part, a comparison of the audio transcript and the textual transcript,
   wherein determining the one or more rich portions includes:
   comparing words of the audio transcript with words of the textual transcript;
   determining each rich portion as a portion of the presentation file where an audio portion of the presentation file yields an audio transcript that includes one or more words that are not included in the textual transcript;
   determining non-rich portions of the presentation file as portions where words of the audio transcript have corresponding words in the textual transcript; and
   presenting, on a display via a user interface, one or more playback controls configured to present the one or more non-rich portions at an accelerated speed relative to the one or more rich portions of the presentation file.

5. The computer program product of claim 4, wherein the presentation file comprises presentation slides and other textual content displayed during the presentation.

6. The computer program product of claim 4, wherein determining the one or more rich portions includes recognizing at least one of one or more concepts and one or more speakers in the one or more audio portions of the presentation file.

7. A computing system including one or more processors and one or more memories configured to perform operations comprising:
   receiving, at a computing device, a presentation file, the presentation file including textual portions displayable via a slide-sharing application and audio portions provided by a speaker who recites the textual portions, expounds upon the textual portions, and speaks on content not provided in the textual portions of the presentation file,
   wherein each textual portion of the presentation file is associated with one audio portion of the audio portions of the presentation file,
   wherein at least one other audio portion of the audio portions of the presentation file includes content spoken by the speaker and does not have a corresponding textual portion in the presentation file, the other audio portion, including content spoken by the speaker and not having a corresponding textual portion in the presentation file, being a rich portion of the presentation file;
   generating an audio transcript of the presentation file, using an automatic speech-to-text (STT) system, from the audio portions of the presentation file;
   generating a textual transcript of the textual portions of the presentation file;
   determining one or more rich portions of the presentation file based upon, at least in part, a comparison of the audio transcript and the textual transcript,
   wherein determining the one or more rich portions includes:
   comparing words of the audio transcript with words of the textual transcript;
   determining each rich portion as a portion of the presentation file where an audio portion of the presentation file yields an audio transcript that includes one or more words that are not included in the textual transcript;
   determining non-rich portions of the presentation file as portions where words of the audio transcript have corresponding words in the textual transcript; and
   presenting, on a display via a user interface, one or more playback controls configured to present the one or more non-rich portions at an accelerated speed relative to the one or more rich portions of the presentation file.

8. The computing system of claim 7, wherein the presentation file comprises presentation slides and other textual content displayed during the presentation.

* * * * *